US 10,885,780 B1

(12) United States Patent
Bseileh et al.

(10) Patent No.: US 10,885,780 B1
(45) Date of Patent: Jan. 5, 2021

(54) VEHICLE TO INFRASTRUCTURE POWER SAVING SYSTEM

(71) Applicants: DENSO International America, Inc., Southfield, MI (US); Denso Corporation, Kariya (JP)

(72) Inventors: Mouhamed S. Bseileh, Dearborn Heights, MI (US); Matthew Dale Clause Buchanan, Detroit, MI (US); Jason J. Wagnitz, Farmington Hills, MI (US); Blaise Friery, West Bloomfield, MI (US); Tom Szawarski, Lake Orion, MI (US)

(73) Assignees: DENSO INTERNATIONAL AMERICA, INC., Southfield, MI (US); DENSO CORPORATION

( * ) Notice: Subject to any disclaimer, the term of this patent is extended or adjusted under 35 U.S.C. 154(b) by 0 days.

(21) Appl. No.: 16/519,139

(22) Filed: Jul. 23, 2019

(51) Int. Cl.
| | |
|---|---|
| *G08G 1/07* | (2006.01) |
| *G08G 1/01* | (2006.01) |
| *G08G 1/087* | (2006.01) |
| *G08G 1/005* | (2006.01) |
| *H04W 4/44* | (2018.01) |

(52) U.S. Cl.
CPC .............. *G08G 1/07* (2013.01); *G08G 1/005* (2013.01); *G08G 1/0112* (2013.01); *G08G 1/087* (2013.01); *H04W 4/44* (2018.02)

(58) Field of Classification Search
CPC ........... H04W 4/44; G08G 1/07; G08G 1/005; G08G 1/012; G08G 1/087
USPC ....................................................... 340/917
See application file for complete search history.

(56) References Cited

U.S. PATENT DOCUMENTS

| | | | |
|---|---|---|---|
| 5,719,771 | A | 2/1998 | Buck et al. |
| 6,892,131 | B2 | 5/2005 | Coffee et al. |
| 2008/0204277 | A1 | 8/2008 | Sumner |
| 2009/0262189 | A1 | 10/2009 | Marman |
| 2014/0320025 | A1* | 10/2014 | Assoulin ................ H05B 47/19 315/154 |
| 2016/0150622 | A1* | 5/2016 | Flinsenberg ........... H05B 47/19 315/297 |

(Continued)

FOREIGN PATENT DOCUMENTS

| | | |
|---|---|---|
| CN | 105072786 A | 11/2015 |
| CN | 105530747 A | 4/2016 |

*Primary Examiner* — Omar Casillashernandez
(74) *Attorney, Agent, or Firm* — Brooks Kushman P.C.

(57) ABSTRACT

A system and method is disclosed for communicating data and transmitting information between roadside infrastructure units regarding vehicle data. In some embodiments, the roadside infrastructure units have one or more communication nodes equipped with a wireless transceiver configured to communicate wirelessly with a vehicle such as a dedicated short-range communication (DSRC) or cellular system. Each communication node can also wirelessly communicate with one or more of the other remaining communication nodes in, for example, a mesh network. One of the communication nodes can establish a connection with the vehicle via DSRC, obtain vehicle-specific data, and transmit at least a portion of this vehicle-specific data to one or more other communication nodes in other roadside infrastructure units. The roadside units can change operation state (e.g., illuminate) in response to receive the vehicle-specific data indicating the vehicle approaching that roadside unit.

18 Claims, 9 Drawing Sheets

(56) References Cited

U.S. PATENT DOCUMENTS

| | | |
|---|---|---|
| 2017/0032402 A1 | 2/2017 | Patsiokas et al. |
| 2019/0164419 A1* | 5/2019 | Kumar ................... G05B 15/02 |
| 2019/0188503 A1* | 6/2019 | Orris, Jr. ................... G06T 7/73 |
| 2019/0347931 A1* | 11/2019 | Ding ................ G08G 1/096708 |
| 2020/0008027 A1* | 1/2020 | Yabuuchi ................ G08G 1/123 |
| 2020/0021950 A1* | 1/2020 | Ma ....................... H04W 72/005 |
| 2020/0198461 A1* | 6/2020 | Dudar .............. B60K 15/03504 |

* cited by examiner

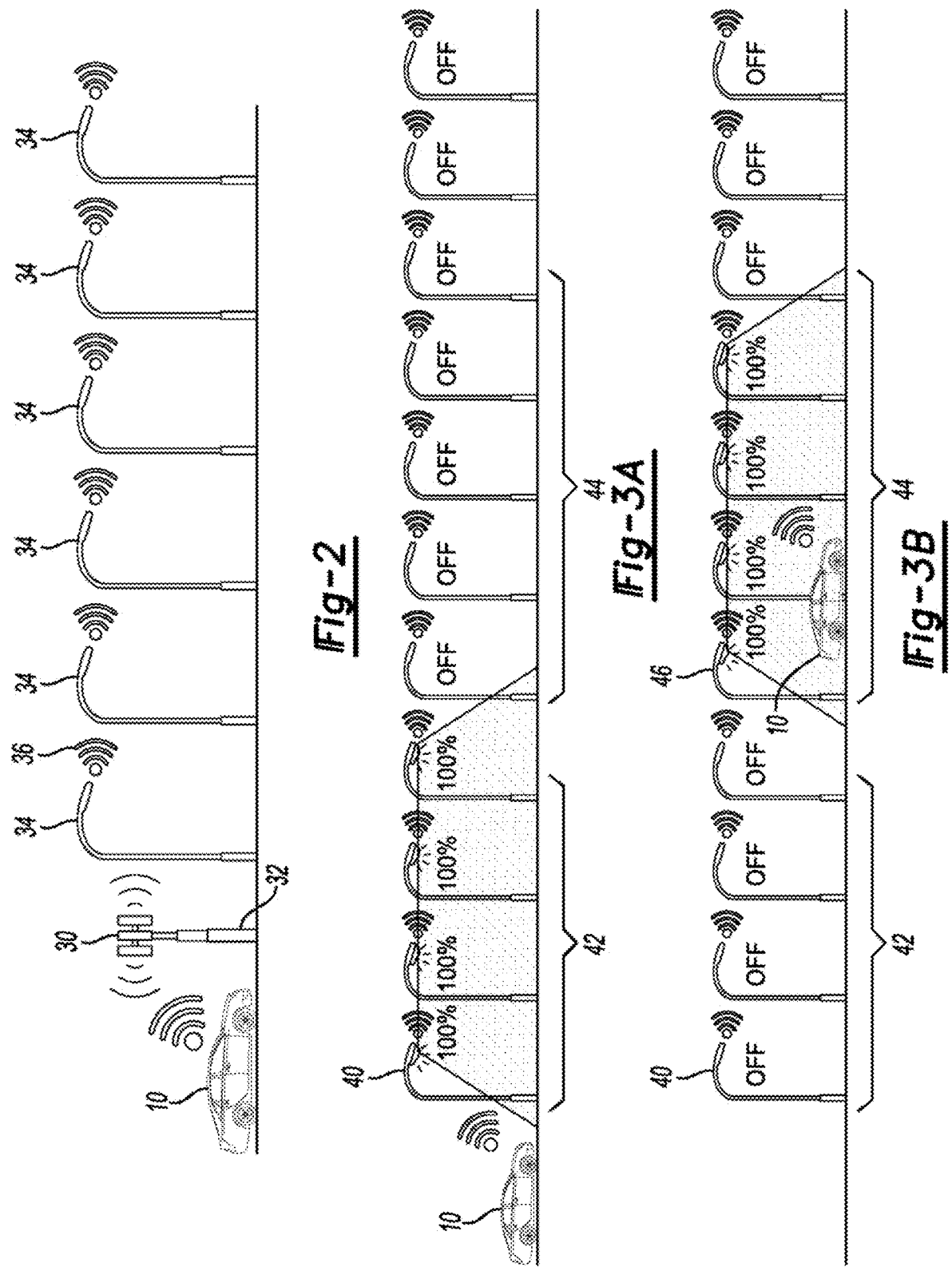

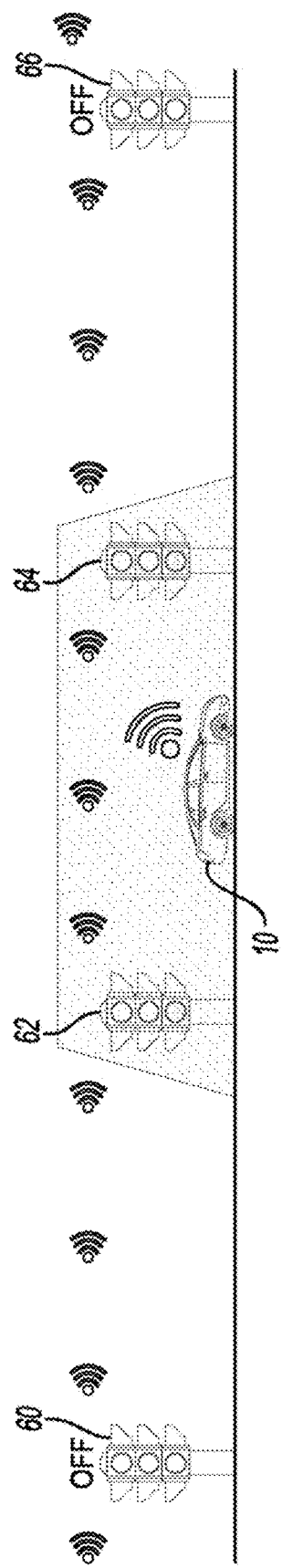
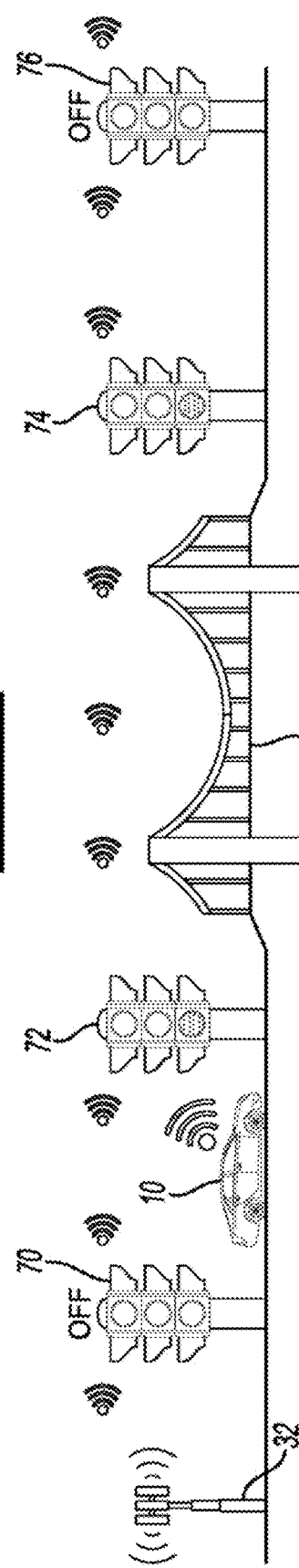
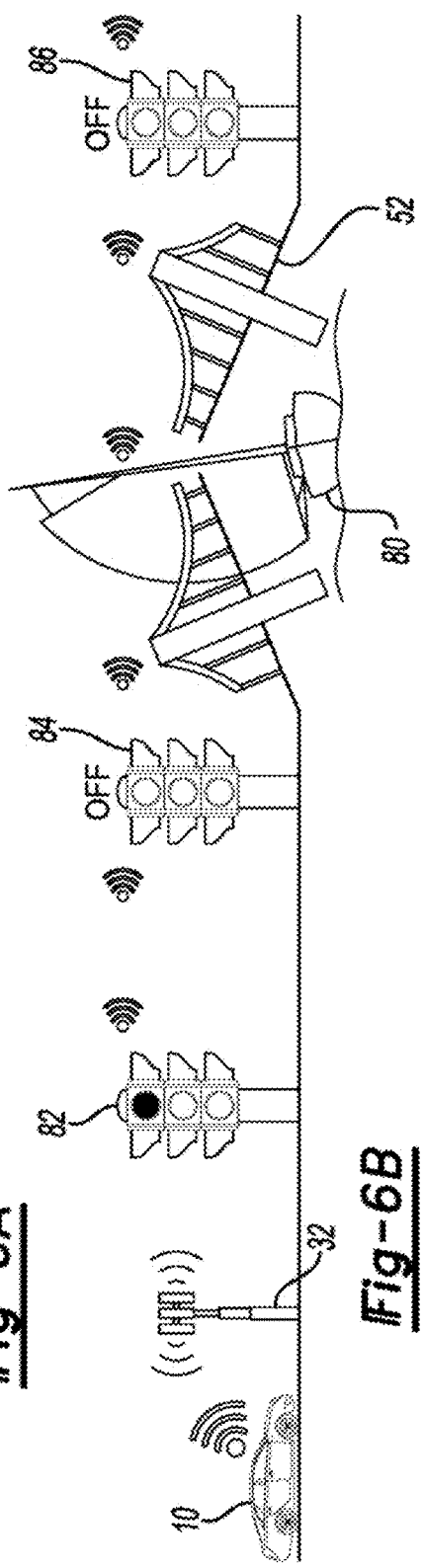

VEHICLE TO INFRASTRUCTURE POWER SAVING SYSTEM

TECHNICAL FIELD

The present disclosure relates to a system that can regulate an operation mode of an infrastructure by using vehicle-to-infrastructure communication.

BACKGROUND

Roadside infrastructure (e.g., street lights, traffic lights, bridges, toll booths, etc.) can consume large amounts of energy.

Vehicle-to-infrastructure (V2I) is a communication model that allows vehicles to share information with the components that support a roadway system. Such components include radio-frequency identification (RFID) readers and cameras, traffic lights, lane markers, streetlights, signage, and parking meters.

SUMMARY

In one embodiment, a roadside infrastructure communication system for communicating vehicle data between various roadside infrastructure units is provided. The system includes a plurality of roadside infrastructure units having a corresponding plurality of communication nodes, with each communication node having a sensor configured to detect a presence of a vehicle, and each communication node further having a wireless transceiver configured to communicate wirelessly with the vehicle via a wireless communication system, and each communication node configured to wirelessly communicate with one or more of the communication nodes. The plurality of communication nodes includes a first communication node having one or more processors configured to (i) establish a communication link between the transceiver and the vehicle via the wireless communication system in response to one of the sensors detecting the presence of the vehicle, (ii) receive vehicle-specific data regarding the vehicle via the wireless communication system, and (iii) command the wireless transceiver to transmit at least a portion of the vehicle-specific data to a second of the communication nodes.

In another embodiment, a roadside infrastructure communication system includes a first roadside infrastructure unit having a controller that includes a processor configured to execute instructions stored on a non-transitory memory. The instructions include (i) establishing a wireless connection with a vehicle in response to a detected presence of the vehicle; (ii) receiving vehicle-specific data from the vehicle via the wireless connection; (iii) transmitting at least a portion of the vehicle-specific data to an off-site cloud for processing; (iv) receiving a signal from the off-site cloud indicative of a need to modify an operating state of a second roadside infrastructure unit based on the processed vehicle-specific data; and (v) responsive to receiving the signal from the off-site cloud, transmitting a command to modify an operation state of the second roadside infrastructure unit.

In yet another embodiment, a roadside infrastructure communication system includes a plurality of roadside lights having a corresponding plurality of communication nodes, with each communication node having a wireless transceiver configured to communicate wirelessly with an emergency vehicle via a wireless communication system, and each communication node configured to wirelessly communicate with one or more of the communication nodes. The plurality of communication nodes include a first communication node having one or more processors configured to (i) establish a communication link between the transceiver and the emergency vehicle via the wireless communication system, (ii) receive a first signal from the emergency vehicle via the wireless communication system indicating the emergency vehicle is operating in an emergency mode, and (iii) command one of the roadside lights that has the first communication node to operate in an emergency-illumination mode to alert vehicle operators of the emergency vehicle operating in the emergency mode.

BRIEF DESCRIPTION OF THE DRAWINGS

FIG. 2 illustrates a schematic of such a vehicle approaching a roadside communication node configured to communicate to the vehicle and to other communication nodes, in this case equipped on roadside lights, according to one embodiment.

FIG. 3A illustrates a schematic of the vehicle approaching a series of roadside lights, and a plurality of the roadside lights illuminating in response to a communication with the vehicle indicating the presence or location of the vehicle approaching the lights, according to one embodiment.

FIG. 3B illustrates a schematic of the system of FIG. 3A after the vehicle has traveled further down the road, in which some roadside lights that the vehicle has passed have deactivated and some other roadside lights near the vehicle have activated, according to one embodiment.

FIG. 5B is a schematic of the road of FIG. 5A illustrating the traffic lights being able to be deactivated once the vehicle has passed them, according to one embodiment.

FIG. 6A illustrates a schematic of the vehicle communication system communicating with other infrastructure such as bridges which can be lowered in advance of vehicles approaching, according to one embodiment.

FIG. 6B illustrates a schematic of the road of FIG. 6A, in which the infrastructure can communicate with boats, trains, or other modes of transportation and make a decision as to the state of the bridge based on the modes of transportation and the approaching vehicle, according to an embodiment.

FIG. 12A illustrates an overhead schematic of a smart-lighting communications system in which lighting is commanded to warn drivers of an upcoming emergency vehicle passing by.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This disclosure provides various embodiments for leveraging vehicle-to-infrastructure (V2I) communication to save power. In other embodiments, vehicle-to-vehicle (V2V), vehicle-to-cloud (V2C), and vehicle-to-everything (V2X) is leveraged for saving power. The power can be saved by the infrastructure itself, such as roadside lights, stop lights, and the like. In other embodiments, power can be saved by utilizing these communication technologies (e.g., V2I) to direct traffic in a manner that promotes more efficient power consumption by the vehicle. Various embodiments are described below that promote such power saving.

Figure 1:
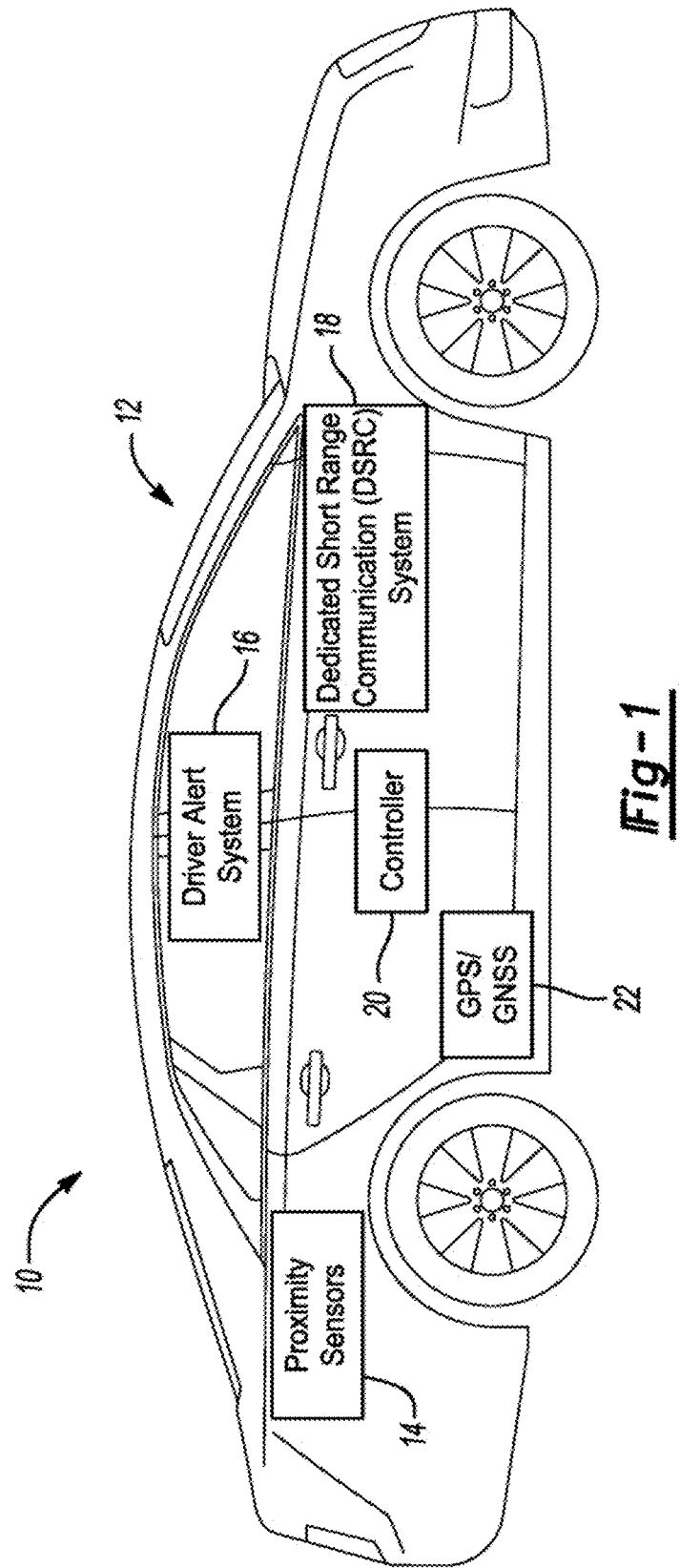
FIG. 1 illustrates a schematic of a vehicle equipped with various sensors and systems described herein, including a wireless communication system, according to one embodiment.

Referring to FIG. 1, a vehicle 10 including a communication system 12 for sending and receiving data with infrastructure and other vehicles is disclosed. Although the vehicle 10 is illustrated as a car, the present teachings apply to any other suitable vehicle, such as a sport utility vehicle (SUV), a mass transit vehicle (such as a bus), bicycles, pev, or a military vehicle, as examples. The communication system 12 is configured to inform a driver of the vehicle 10 of various information, such as an upcoming stoplight or intersection, an approaching or upcoming vehicle, etc. The communication system 12 is also configured to communicate to other vehicles, infrastructure (e.g., roadside communication nodes), etc., supplying data and information about the vehicle 10 itself, such as its location, presence, speed, etc.

The vehicle's communication system 12 may include one or more proximity sensors 14, a driver alert system 16, a wireless system 18 (e.g., DSRC system), a controller 20, and a global positioning system (GPS), global navigation satellite system (GNSS) 22, or any other satellite navigation system.

The controller 20 can be any suitable controller for monitoring and/or controlling one or more of the proximity sensors 14, the driver alert system 16, the wireless communication system 18, the GPS/GNSS 22, and/or additional vehicle systems, sensors, and functions. In this disclosure, including the definitions below, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein. In one example, the controller 20 may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Per, and PL/SQL.

The controller 20 may be in communication with the proximity sensors 14 or systems 16, 18, 22 via a direct connection to one or more of these components, such as via various input/output (I/O) ports of the controller 20. Additionally, the controller 20 may communicate with one or more of these other components over one or more in-vehicle networks, such as a vehicle controller area network (CAN), an Ethernet network, a media oriented system transfer (MOST) network, and a wireless local area network (W LAN).

The proximity sensors 14 include one or more sensors configured to identify and/or detect the presence of objects, such as pedestrians, cyclists, or other vehicles, in one or more areas around the subject vehicle 10. The proximity sensors 14 can include any suitable sensors, such as any suitable RADAR, LIDAR, camera, ultrasonic, or other suitable sensors for detecting objects in an area around the subject vehicle 10. The proximity sensors 14 can be mounted at any suitable position on the subject vehicle 10, such as in the front of the subject vehicle 10, rear of the subject vehicle 10, near the front corners of the subject vehicle 10, near the back corners of the subject vehicle 10, or along the sides of the subject vehicle 10. The proximity sensors 14 and its associated controller 20 may be in communication with other systems in the vehicle 10 for detecting information about the surroundings of the vehicle. For example, the proximity sensors 14 may detect the presence of a pedestrian at or near a crosswalk, and the controller 20 may coordinate this information with the wireless communication system 18 when establishing and performing a communication link to the mobile device of the pedestrian.

The driver alert system 16 can be a system with structure and hardware suitable for alerting the driver of the vehicle 10 of an upcoming obstacle or object. This may include a driver vehicle interface (DVI) configured to provide a visual alert. The alert provided to the driver may be visual alert, an audible alert, a tactile alert (also referred to as a haptic alert), or other suitable alert to prompt the driver.

The wireless communication system 18 can be utilized by the vehicle 10 to communicate with infrastructure on or around the road, such as communication nodes of street lights, stop lights, roadside units, bridges, intersections, other vehicles, mobile devices (e.g., cellular phones) of pedestrians, etc. For example, the wireless communication system 18 can be configured to communicate with a communication node or wireless communication radio at an intersection to receive map data including the layout of the intersection and a signal phase and timing (SPaT) data including traffic signal (e.g., stop light) information. The wireless communication system 18 of the vehicle 10 can receive signals from the communication node representing a status of each traffic light (e.g., red, yellow, green), a countdown timer until the traffic light changes another color. As will be explained in embodiments below, the wireless communication system 18 can also communicate to the communication nodes the presence and location of the vehicle 10 such that the corresponding infrastructure (e.g., traffic light) can respond accordingly. In doing so, the wireless communication system 18 can communicate with other sensors or systems in the vehicle (e.g., the GPS/GNSS 22) and send signals reflective of those systems. In one example, in response to the vehicle 10 approaching the communication node of a traffic light and being within a certain threshold distance, the traffic light may energize from being powered off to being powered on, with a green light to proceed. The wireless communication system 18 may send a signal including the GPS/GNSS location of the vehicle 10, or merely the presence of the vehicle and distance relative to the communication node. Once the vehicle 10 has passed the communication node by a certain distance via knowledge from the wireless communication system 18, the traffic light may deenergize from being powered on to powered off, to conserve power usage.

In additional examples, the wireless communication system 18 of the vehicle 10 may communicate with wireless communication systems of other vehicles to determine the location of other vehicles, or the wireless communication system 18 can communicate with the wireless communication systems found on pedestrians and cyclists with cell-phones, wearables, or other mobile devices. Vehicles, pedestrians, and cyclists could provide their dimensions, positions, predicted path, and acceleration through their mobile devices.

The wireless communication system 18 may be or include a dedicated short-range communication (DSRC) system having one or more wireless transceivers configured to facilitate direct wireless communication with other components such as other vehicles, mobile devices of pedestrians or other vehicle occupants, or roadside communication nodes when those other components are local to (e.g., within direct wireless communication range of) the vehicle 10. To facilitate such local wireless communications, the wireless communication system 18 may include one or more of a Bluetooth transceiver, a ZigBee transceiver, a Wi-Fi transceiver, a radio-frequency identification ("RFID") transceiver, a near-field communication ("NFC") transceiver, a vehicle-to-vehicle (V2V) transceiver, a vehicle-to-infrastructure (V2I) transceiver, and/or additional transceivers designed for other radio-frequency (RF) protocols.

The GPS/GNSS system 22 of the vehicle 10 may be configured to generate GPS/GNSS data for the vehicle 10, such as via a transceiver communicating with one or more satellites orbiting Earth. The GPS data may indicate a current geographic location of the vehicle 10, such as by including current longitude and latitude coordinates of the vehicle 10. The GPS/GNSS system 22 may communicate the GPS data to the controller 20, which may be configured to utilize the GPS data to determine the geographical location of the vehicle 10, and to correspondingly determine the geographic location of objects (e.g., roadside infrastructure described herein) detected as proximate to the vehicle 10. The controller 20 may also be configured to determine a heading direction of the vehicle 10 based on received GPS/GNSS data indicating a changed position of the vehicle 10 over a short time span (e.g., one second), suggesting that the vehicle 10 is moving in a direction corresponding to the change in position.

FIG. 2 and the remaining Figures illustrate various communication nodes associated with various infrastructure. FIG. 2 shows a general example of communication between the vehicle 10 and other communication nodes. For example, as illustrated in FIG. 2, the vehicle 10 communicates with a communication node 30 of a roadside infrastructural unit 32, which can, in turn, communicate with various communication nodes of roadside lights 34. The roadside units 32 may also have on-board storage and processing structure such as a controller to collect and process data and communicate such processed data to other communication nodes in the infrastructure. As indicated by several symbols 36 indicating wireless communication, the communication nodes can communicate with one another and also with the wireless communication system 18 of the vehicle 10. In this Figure and the remaining Figures, the communication nodes can receive information and data specific to that vehicle 10, including, for example, the vehicle's location, orientation, speed, acceleration, status (e.g., whether the vehicle's engine is operating properly or improperly), and the like. As the vehicle 10 approaches the roadside unit 32, the communication node 30 can receive this data from the vehicle 10. The communication node 30 can then transmit at least some of this data to other communication nodes, such as those on roadside lights 34, upcoming traffic lights (e.g., red/yellow/green signals), bridges, other vehicles, toll stations, etc.

A communication node is an entity for data communication, and may be installed or associated with infrastructure units such as roadside units 32, roadside lights 34, bridges, other vehicles, tunnels, traffic signals, a router, a switch device, etc. Communicating data between two communication nodes (e.g., between the vehicle 10 and a roadside communication node) may be at a dedicated channel (e.g., 5.9 GHz with a 75 MHz bandwidth) for dedicated short-range communications. Each communication node may include a 4G/5G transceiver and/or receiver configured to communicate wirelessly with a 4G/5G transceiver or receiver in a vehicle, mobile device, other communication node, etc. The communication nodes may communicate wirelessly via the 4G/5G transceiver or receiver, WiFi, DSRC, Bluetooth, etc. To detect the presence of a vehicle (for example), the communication node may be provided with a separate RF receiver that "wakes up" the transceiver in the communication module in response to receiving a RF signal of the vehicle. Then, communication may be established between the communication node and the vehicle via the methods explained above (e.g., 4G/5G, DSRC, WiFi, Bluetooth, etc.). The roadside unit 32 may have additional or different communication nodes configured to send/receive data to offsite facilities for processing and storage.

FIGS. 3A-3B illustrate a power-saving system for saving power output by the roadside infrastructure. The vehicle 10 can communicate to one or more communication nodes, such as nodes on roadside units like overhead road lights 40. In FIG. 3A, the vehicle 10 approaches a first light 40 of a group of lights 42. Based on a signal received from the vehicle 10 approaching the lights 42, the communication node associated with one or more of the lights 42 can activate or illuminate those lights. The signal transmitted from the vehicle 10 can be vehicle-specific data including the GPS location of the vehicle 10, or the distance from the first of the lights 40, for example. Meanwhile, a second group of lights 44 remain off, conserving power.

As the vehicle 10 travels down the road, lights that the vehicle has passed can be turned off and lights that the vehicle is approaching can be turned on. For example, as shown in FIG. 3B, as the vehicle 10 approaches a first light 46 of the second group of lights 44, that light 46 and lights of the second group of lights 44 can be activated. Meanwhile, the overhead lights in the first group of lights 42 can be disabled once the vehicle has traveled a sufficient distance from those lights. As the vehicle 10 travels down the stretch of road, the lights can communicate to each other so that the communication nodes in the upcoming overhead lights know where the vehicle is and can activate the light source when the vehicle is a particular distance away. In one embodiment, each light can be turned on once the vehicle 10 is a certain distance (e.g., 1000 feet) from that light, and each light can be turned off once the vehicle 10 has traveled a certain distance (e.g., 100 feet) past that light. This results in a sequential activation and deactivation of lights as the vehicle 10 passes the lights.

The embodiment described in FIGS. 3A-3B may be beneficial for rural areas or roads/highways that undergo significant time with little or no traffic. Significant power savings can occur in such areas. For example, if a particular stretch of highway has only one vehicle travel across the highway every five minutes during some night hours, the lights may only be on and consuming power for 10-20 seconds every five minutes, depending on the speed of that vehicle. Every five minutes, the lights can be activated as a vehicle approaches to light the road for safe viewing of that driver, and can then be turned off to cease power consumption by the light source until the next vehicle approaches. This can result in over 90% reduction of power consumption of each roadside light.

In an exemplary use scenario of the embodiments shown in FIGS. 3A-3B and other embodiments described herein, the communication node may detect the presence of a vehicle via an initial RF signal received from the vehicle by the communication node, for example. In response to the communication node detecting a presence of a vehicle, a processor at the communication node may initiate the communication node to establish a communication link with the vehicle for transmitting and receiving data via 4G/5G, WiFi, Bluetooth, DSRC, etc. Also, the communication node may be commanded to transmit a signal to another (e.g., an adjacent) communication node, informing that communication node of the presence of the vehicle. Prior to transmitting or receiving the data from the vehicle, an authentication session may occur. In one embodiment, the communication node may authenticate the vehicle to confirm the vehicle is truly a vehicle and authorized to transmit data. The authentication process may include, for example, receiving several sequential signals from the vehicle rather than relying on one signal received from the vehicle. Once several sequential signals are received over time (e.g., 200 milliseconds), a communication link is established (e.g., via 4G/5G, WiFi, Bluetooth, DSRC, etc.) and information can be received by or sent to the vehicle. The communication node that established the communication link with the vehicle may then receive the vehicle data, and transmit that data to other communication nodes and also to a roadside unit. The roadside unit may have a processor configured to process the information received from the vehicle to determine an anticipated travel path of the vehicle, anticipated arrival time at various infrastructure units, etc. In an alternative embodiment, the roadside unit can transmit this data wirelessly (e.g., WiFi) to an off-site cloud in which an off-site processor can perform this function. The off-site cloud may include a collection of one or more back-end servers or computers from one or more vendors (e.g., a collection of clouds) to collect and process the information off-site from the infrastructure units where more capabilities are available. Once the data has been processed, the roadside unit can communicate with one or more of the communication nodes with commands to activate or modify certain infrastructure (e.g., turning roadside lights on) when the vehicle is anticipated to be a certain distance from that infrastructure. The data and commands can also be sent from communication node to communication node along the road.

It should be understood that this type of communication is not limited to a vehicle, but can also be made with a mobile device, infrastructure, etc. including all embodiments described herein.

It should also be understood that turning on and off various lights is but one example of modifying an operation state of an infrastructure unit. For example, the infrastructure units can be commanded to transition into a power-saving mode in which illuminating light sources are deactivated or dimmed. Another example of modifying an operation state of the infrastructure unit includes turning on/off billboards, raising or lowering bridges, opening or closing toll booths, turning on/off traffic signals, etc.

There may be situations in which the vehicle (or other device) is not properly equipped to send or receive signals to or from the communication node. Additional sensors in or around the communication node can thus be provided detecting the presence of a vehicle. For example, LIDAR, RADAR, cameras, etc. can be provided to detect the presence or motion of an object, and then send a corresponding signal to the communication node(s) with a signal indicating the presence of the vehicle, which can be communicated to the remaining communication nodes in the path of the vehicle.

In one embodiment, once a communication link is established between the vehicle (or other object) and the communication node (e.g., a communication node at a traffic signal or overhead light), the communication node can receive vehicle-specific data (e.g., data specific to that particular vehicle at that time) indicating the presence, speed, direction, route (e.g., via GPS data), etc. That communication node can communicate wirelessly to other communication nodes along the road and transmit that data. The communication nodes down the road can then activate the corresponding infrastructure (e.g., turn on a light) in response to the vehicle approaching or planned to be within a threshold distance from that light.

Figure 4:
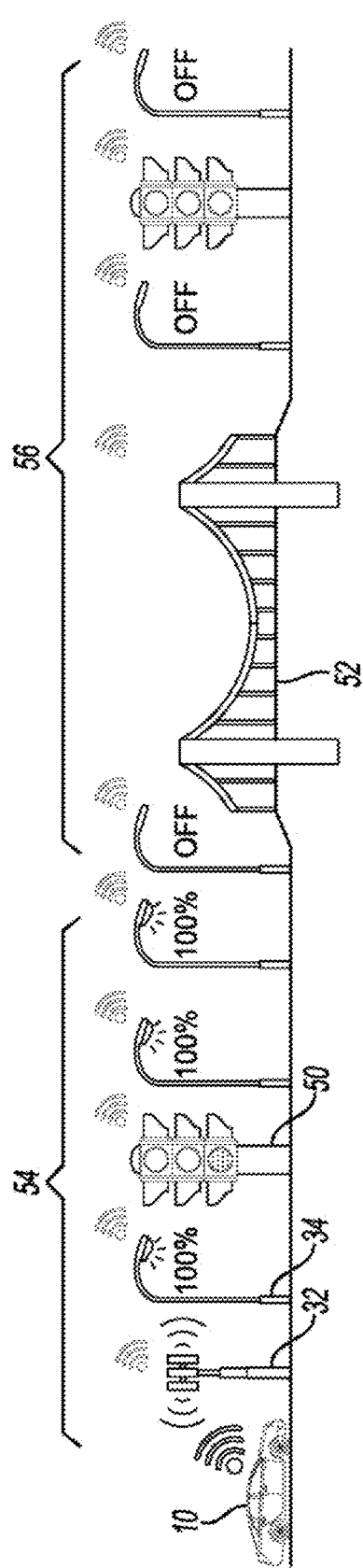
FIG. 4 illustrates a schematic of a communication system or network in which various communication nodes are part of several infrastructural units, according to one embodiment.

FIG. 4 illustrates a section of road with various forms of infrastructure having communication nodes. In this example, a section of road includes various infrastructure such as a roadside unit 32, overhead lights 34, traffic lights 50, and a bridge 52, each having a communication node configured to communicate signals and data explained above with other communication nodes and with the vehicle 10. This provides a communication network between and amongst an approaching vehicle and the various infrastructure units along the road. Each infrastructure unit can be activated, deactivated, or otherwise controlled based on the presence and/or location of the vehicle 10. For example, as the communication nodes determine that the vehicle 10 is within a certain distance from a traffic light 50, the traffic light 50 may be activated or change states (e.g., from a blinking yellow light to a solid green light or solid red light, for example.) In another example, as the communication nodes determine that the vehicle 10 is within a certain distance from a bridge 52, the bridge can be drawn or prevented from being drawn.

As shown in FIG. 4, a first group 54 of infrastructure units are activated in response to the vehicle 10 being within a certain distance of approach, for example. A second group 56 of infrastructure units remain deactivated, as the vehicle 10 is too far away and safely viewing these units would not be necessary by the driver of the vehicle 10. As the vehicle 10 becomes closer to various infrastructural units in the second group 56, however, the infrastructure units can be individually activated or controlled based on a threshold distance being reached between the vehicle 10 and that particular infrastructure unit.

Figure 5A:
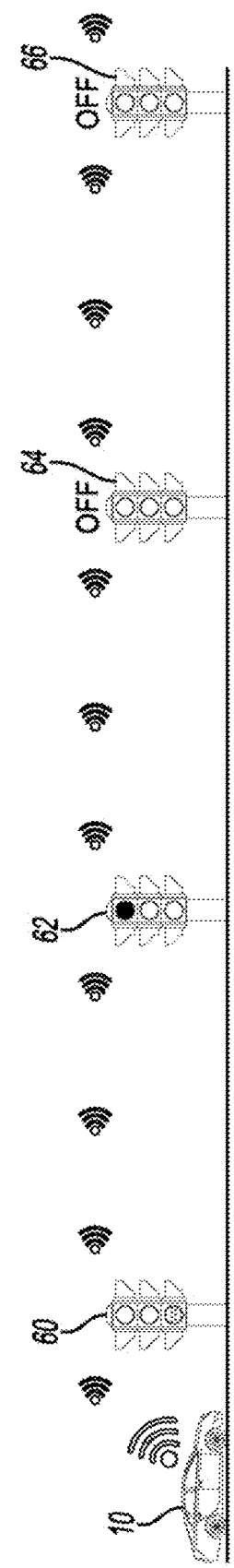
FIG. 5A illustrates a schematic of a road segment in which a vehicle approaching a series of traffic lights causes a first traffic light to activate and be green, a subsequent traffic light to be activated, and subsequent traffic lights to remain deactivated, according to one embodiment.

FIGS. 5A-5B illustrate an embodiment of a vehicle 10 approaching a series of traffic lights, namely a first traffic light 60, a second traffic light 62, a third traffic light 64, and a fourth traffic light 66. Each traffic light is provided or associated with a communication node for communicating information between one another and/or with the vehicle 10. The traffic lights may remain off or deactivated if no vehicle is detected in a certain vicinity. In response to the vehicle 10 being within a threshold distance (e.g., 1000 feet) from the first traffic light 60, the first traffic light 60 can activate and show a green traffic signal for the vehicle 10. The first traffic light 60 can remain green for a time according to a normal schedule, or the traffic light 60 can remain green until another vehicle is detected within the threshold distance and going in a different direction. For example, the first traffic light 60 can activate and turn green for the vehicle 10 traveling North/South in response to the vehicle being within 1000 feet, and can remain green until either (a) the vehicle 10 passes the first traffic light 60 by a threshold distance (e.g., 300 feet) or (b) a second vehicle is detected within 1000 feet of the first traffic light 60 traveling East/West. Once the second vehicle is detected in the East/West direction within the threshold distance, the first traffic light 60 may change modes; instead of remaining green until the vehicle 10 is passed the traffic light by a threshold distance, the first traffic light 60 may stay green for a certain time according to its standard timing schedule (e.g., 30 seconds). As also indicated in FIG. 5A, the second traffic light 62 may be activated, but may be initially illuminating red due to another vehicle approaching the second traffic light 62 in a cross direction relative to the vehicle 10. The third and fourth traffic lights 64, 66 remain off due to the vehicle 10 being further than a threshold distance from those lights.

In FIG. 5B, the first traffic light 60 has been turned off in response to the vehicle 10 passing that light by a sufficient threshold distance. The third traffic light 64 has been illuminated in response to the vehicle 10 being within a certain distance from the third traffic light 64. This provides a sequential illumination and deactivation of traffic lights as the vehicle 10 travels along the road segment. This again provides significant power savings in areas or times of low traffic.

FIG. 6A illustrates a stretch of road having several communication nodes associated with roadside units and traffic lights. The communication system between and amongst the communication nodes can determine when a vehicle may approach a certain area (e.g., bridge 52) depending on past knowledge. For example, the roadside unit 32 may detect the presence of the vehicle 10, its speed, and its direction, either by internal processing or by receiving such data from the vehicle 10 itself. This information may be relayed to traffic light 70 for activation and operation as explained above. Once the vehicle 10 has passed that traffic light 70, the traffic light may deactivate to save power consumption, as explained above. The data regarding the vehicle 10 may be forwarded or transmitted to other communication nodes associated with another traffic light 72, bridge 52, traffic light 74, and traffic light 76. In preparation for the vehicle 10 approaching, the bridge 52 can be lowered, and traffic lights 70, 76 may remain in a power-save or deactivated state unless and until the vehicle 10 comes within a threshold distance.

In some embodiments, the infrastructure can communicate with boats, trains, or other modes of transportation. The infrastructure will detect the position of multiple objects and determine the appropriate state that the infrastructure should be in. For example, as shown in FIG. 6B, a boat 80 with an on-board communication node may be detected by the communication node on the bridge 52 or the roadside unit 32 as being closer to the bridge 52 than an approaching vehicle 10. In response to the boat 80 being closer to the bridge 52 than the next approaching vehicle 10, the bridge will be raised for the boat 80, and a traffic light 82 will turn red for the vehicle 10. If additional vehicles are not detected within a threshold distance of other traffic lights 84, 86, those traffic lights 84, 86 can be deactivated or put in a power-save mode to reduce the power consumed by the lights in the traffic lights. For example, if a traffic light 84 is between the illuminated traffic light 82 and the bridge 52, illumination of a red, yellow or green light may be unnecessary because the vehicle 10 is already stopped at the traffic light 82, and thus the traffic light 84 can be disabled or deactivated to not consume power and illuminate light. Once the boat 80 has passed the bridge by a sufficient distance, the communication nodes detect such information and correspondingly command the bridge 52 to be lowered. Once the bridge 52 is lowered, the traffic light 82 can turn green for the vehicle 10, allowing the vehicle to travel across the bridge 52.

Multiple vehicles on the road can communicate with each other and with the infrastructure, giving the infrastructure additional information about the overall traffic on the road. This keeps the infrastructure in the appropriate power state, working to minimize the transitions between on and off, for example. For example, the infrastructure and roadside communication nodes in the system can determine that there are three vehicles on the road approaching the bridge. Even if the vehicles are hundreds of yards away from one another, the system can keep the bridge in a lowered state to allow all three vehicles to cross the bridge before raising up to allow for a passing boat. This saves power by not having to raise the bridge for a passing boat after the first vehicle crosses the bridge, and then lower it again for the second and third vehicles to cross over the bridge.

Figure 7:
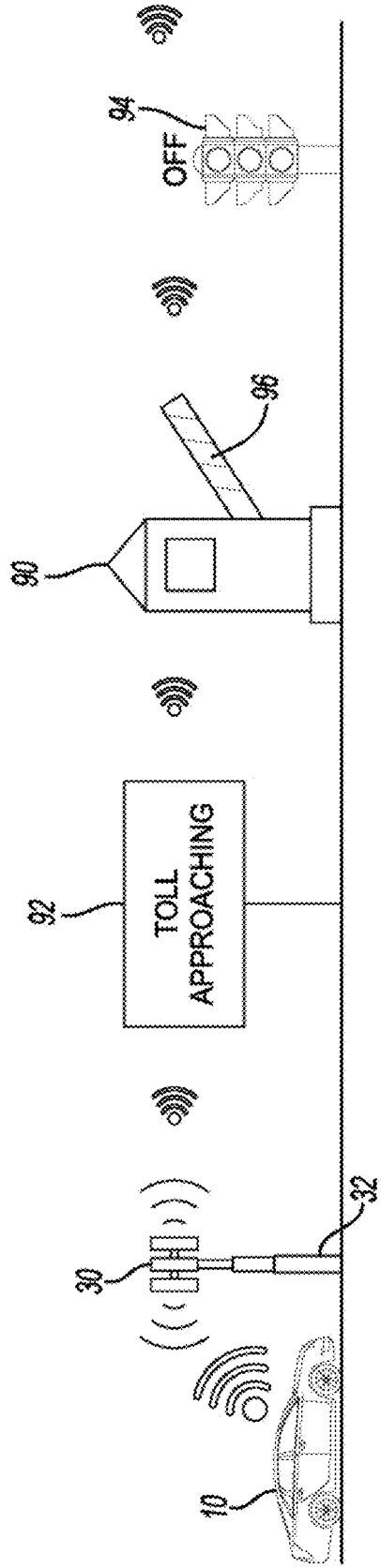
FIG. 7 illustrates a schematic of the vehicle communicating with communication nodes associated with toll booths, according to an embodiment.

FIG. 7 illustrates an example of the vehicle 10 approaching a toll booth 90, typically used for collecting money from vehicles as payment for traveling on the road. A communication node 30 of an associated roadside unit 32 can detect the presence, location, orientation, etc. of the vehicle 10. This information can be transmitted to the toll booth 90, an electronic sign 92, traffic light 94, and the like. The electronic sign 92 can remain in a dormant or deactivated state until the vehicle 10 approaches the sign 92 and is located within a threshold distance from the sign 92, as detected from any of the communication nodes. In response to the vehicle 10 being within the threshold distance from the sign 92, the sign 92 can illuminate with a message, e.g., "TOLL APPROACHING." The toll booth 90 can also then "wake up" from its power-saving mode, and activate certain structure like dropping a traffic barrier 96.

In another embodiment, the sign 92 is a construction or traffic sign, that can be illuminated in response to the vehicle 10 being within a threshold distance. The sign can provide information to the vehicle 10 visually, with messages such as "BRIDGE CLOSED AHEAD," "SLOW DOWN," "RIGHT LANE MERGES AHEAD," and the like. Also, the messages may change based on data received by the vehicle 10. For example, if the communication nodes detect or receive information from the vehicle 10 regarding the vehicle traveling at a speed greater than a threshold speed which would indicate that the vehicle 10 is speeding over the speed limit, the message on the traffic sign may read "SLOW DOWN."

Figure 8:
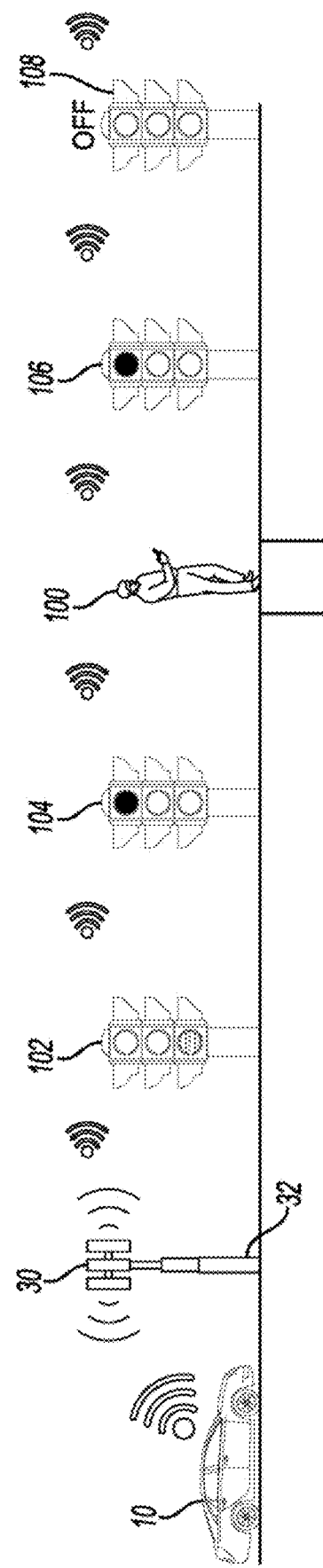
FIG. 8 illustrates a schematic of the vehicle communicating with communication nodes of the roadside units and infrastructure which can also communicate with mobile devices (e.g., cell phones) of pedestrians, according to an embodiment.

FIG. 8 illustrates an embodiment of a communication established between the vehicle 10, the roadside communication nodes, and a mobile device 100 carried by a pedestrian. In an example, the mobile device 100 communicates with roadside communication nodes associated with the infrastructure, such as one or more traffic lights 102, 104, 106, and/or 108. A communication link between the mobile device 100 and one of these communication nodes informs the infrastructure and system of location of the mobile device 100 (and thus, the pedestrian). In one example, in response to the location of the mobile device 100 being proximate to a point of crossing the road (such as a crosswalk), a traffic light 104, 106 can be activated and illuminated in red and a cross-walk light can be activated to grant the pedestrian passage across the road. Meanwhile, the presence of the vehicle 10 as communicated to a communication node 30 may be translated to the remainder of the infrastructure, illuminating upcoming traffic light 102. A traffic light 108 that remains outside of a threshold distance from the vehicle can remain off to conserve power.

Figure 9:
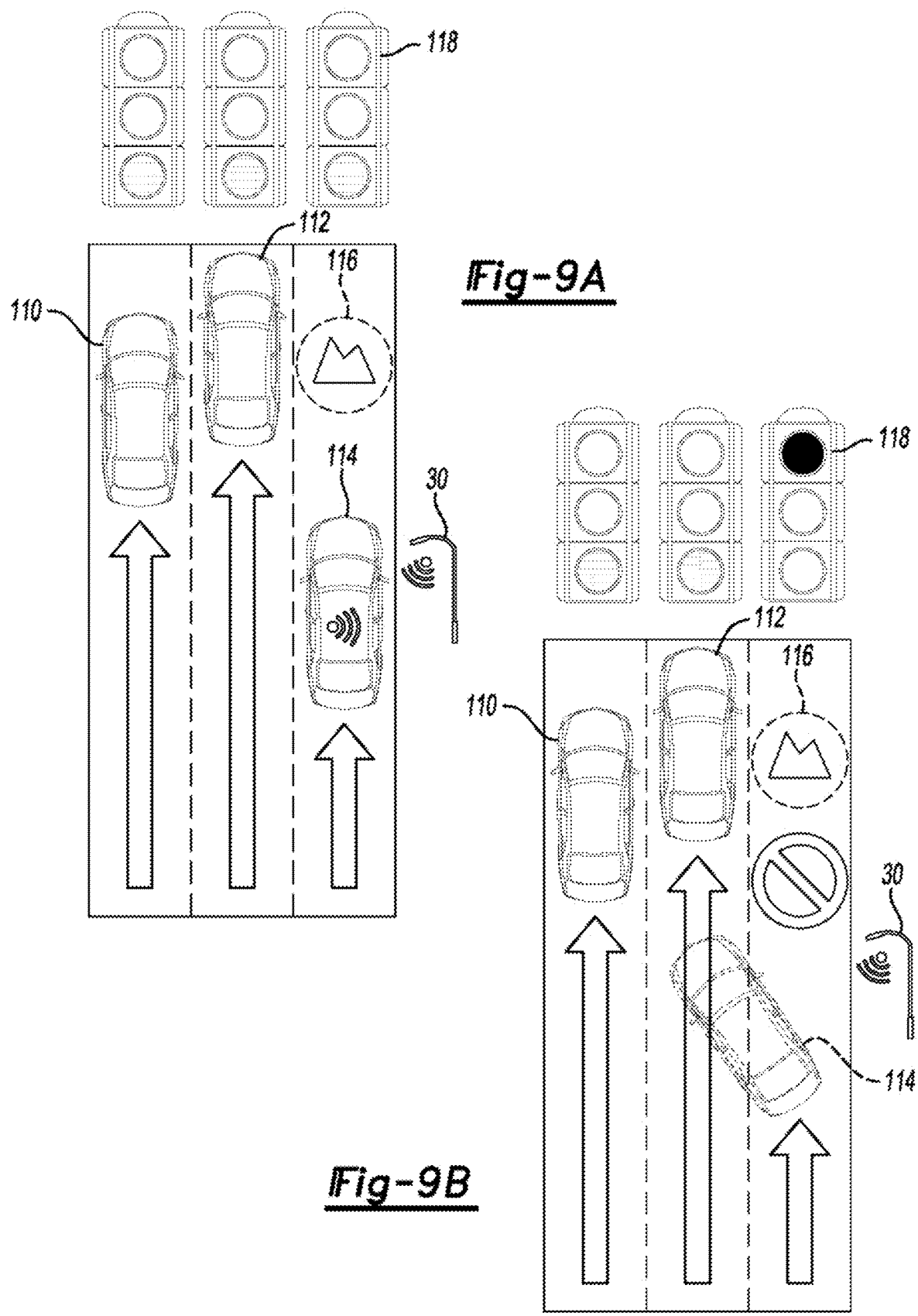
FIG. 9A illustrates an overhead schematic of infrastructure communicating to a vehicle with data indicating an upcoming hazard or lane closure.
FIG. 9B is the same overhead schematic with an accident being avoided due to the communication of such a hazard or lane closure.

FIGS. 9A-9B illustrate an embodiment of communication between the vehicle and communication nodes of roadside infrastructure for leveling lane ware and avoiding hazards in the road. Vehicles traveling across high-speed roads such as highways may encounter a hazard that is present on the road (such as debris in their lane) and may not be afforded sufficient reaction time to avoid the hazard. According to this embodiment, communication between various vehicles and the infrastructure can enable the infrastructure to communicate to other vehicles of the hazard and redirect those vehicles to another lane for safety.

In one embodiment, several vehicles 110, 112, 114 are driving along a highway, and can communicate with a communication node 30 of an infrastructural unit. At least one of the vehicles 110, 112 detects the presence of a hazard 116 in the right lane, via its proximity sensors 14, for example. Information regarding the presence of the hazard 116 can be communicated to the communication node 30. The communication node 30 can then communicate the presence of this hazard 116 to an approaching vehicle 114, alerting that vehicle of the hazard. A corresponding alert can be displayed within the vehicle 114, alerting the driver of the upcoming hazard. In another embodiment, a traffic light 118 associated with the lane of travel where the hazard 116 is located can change states to shift traffic to another lane, as shown in FIG. 9B.

This can also be implemented with lane wear management. For example, as several vehicles travel along the road and communicate with the roadside communication node 30, the infrastructure system can determine a density or amount of vehicles traveling per lane. If one lane (e.g., the far right lane) is being traveled over with substantially more vehicles than the other lanes, as indicated by the communication between the vehicles and the roadside communication node, alerts or other indicators (e.g., traffic lights) can be activated to direct traffic into another lane and temporarily close the far right lane. This manages wear on certain lanes.

Figure 10:
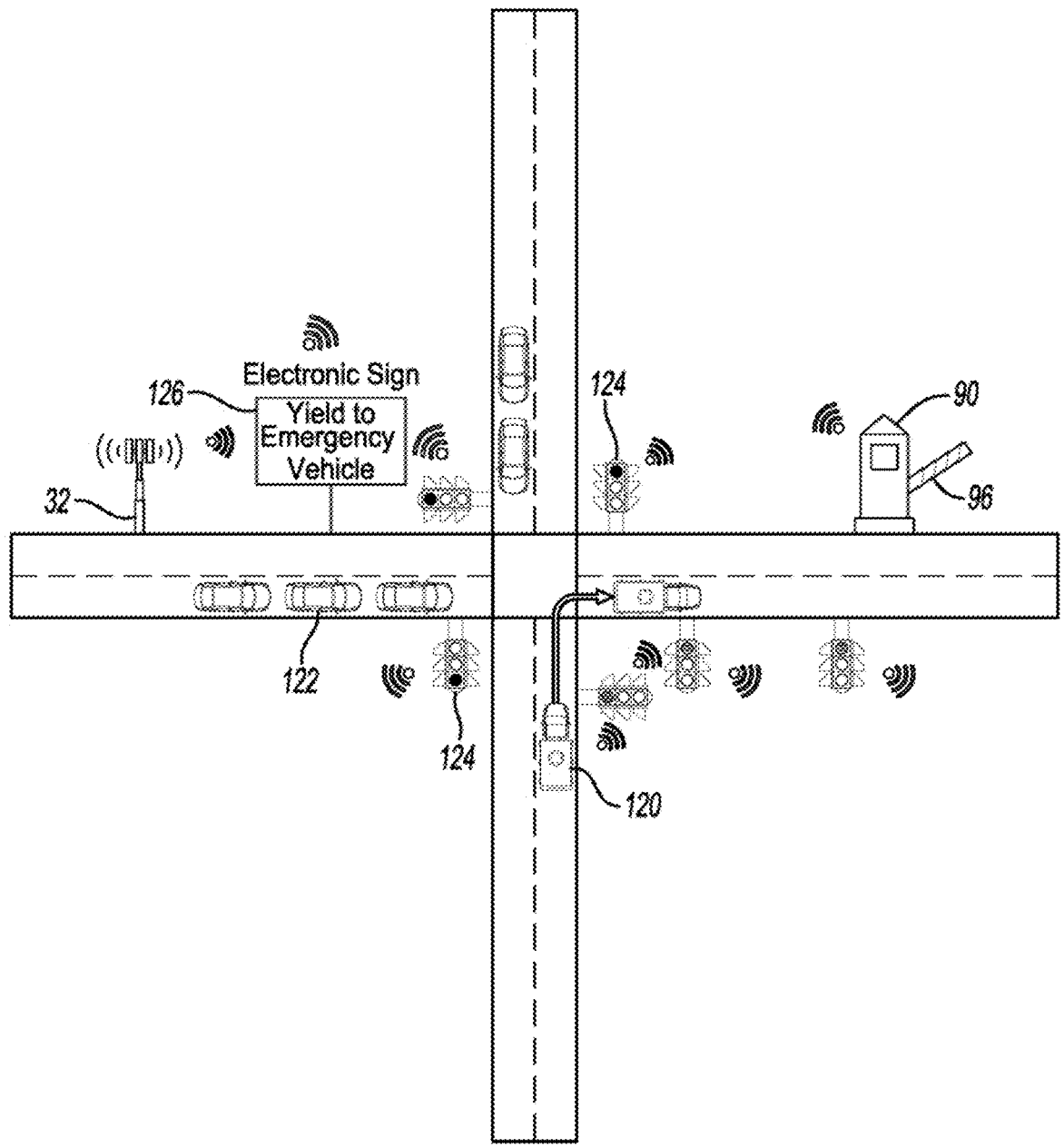
FIG. 10 illustrates an overhead schematic of a communication system in which vehicles and roadside infrastructure communicate to inform the vehicles of the presence of an emergency vehicle, with infrastructure being controlled to improve the ease of travel for the emergency vehicle, according to an embodiment.

FIG. 10 illustrates an embodiment of communication between the vehicle and communication nodes of roadside infrastructure for traffic management with respect to emergency vehicles. Emergency vehicles should have priority of the road and infrastructure for critical situations where timing and speed of the emergency vehicle is important. In order to give emergency vehicles (e.g., ambulances, fire trucks, police vehicles, military vehicles, etc.) priority on the road, the vehicle-to-infrastructure system of this disclosure can be used.

In one embodiment, an emergency vehicle 120 communicates to one or more roadside infrastructure communication nodes, such as those nodes associated with traffic lights, overhead lights, roadside units, etc. The emergency vehicle 120 can also communicate with other vehicles 122 on the road by, for example, wireless communication such as DSRC, cellular, or any other wireless communication protocol. The emergency vehicle 120 may communicate a desire of priority on the road by activating a switch, such as a siren, flashing lights, etc. This can initiate the infrastructure to act in an emergency mode that overrides its normal operation mode. For example, the infrastructure can make traffic lights 124 red for opposing streets, lower bridges in advance of the emergency vehicle 120 approaching, raise traffic barriers 96 at toll booths 90 and maintain them in a raised state, etc. Electronic signs 126 can also be activated to provide a visual warning to the vehicles 122 to change lanes, yield to the emergency vehicles, etc. The other vehicles 122 can also receive a warning within the vehicle itself (e.g., via human-machine interface, HMI) that the emergency vehicle is nearby or approaching.

In one embodiment, the roadside unit 32 can have its own processing module to act as the main processing point for the infrastructure. The roadside unit 32 can receive the data from various communication nodes, receive data regarding the intended route of the emergency vehicle 120, and command the necessary changes by the infrastructure (e.g., traffic lights, etc.) accordingly. The infrastructure within a predetermined distance (e.g., 200 feet) around the emergency vehicle 120 can be placed in this emergency mode of operation; the infrastructure can return to its normal mode of operation once the emergency vehicle 120 has gone outside the predetermined distance.

Figure 11:
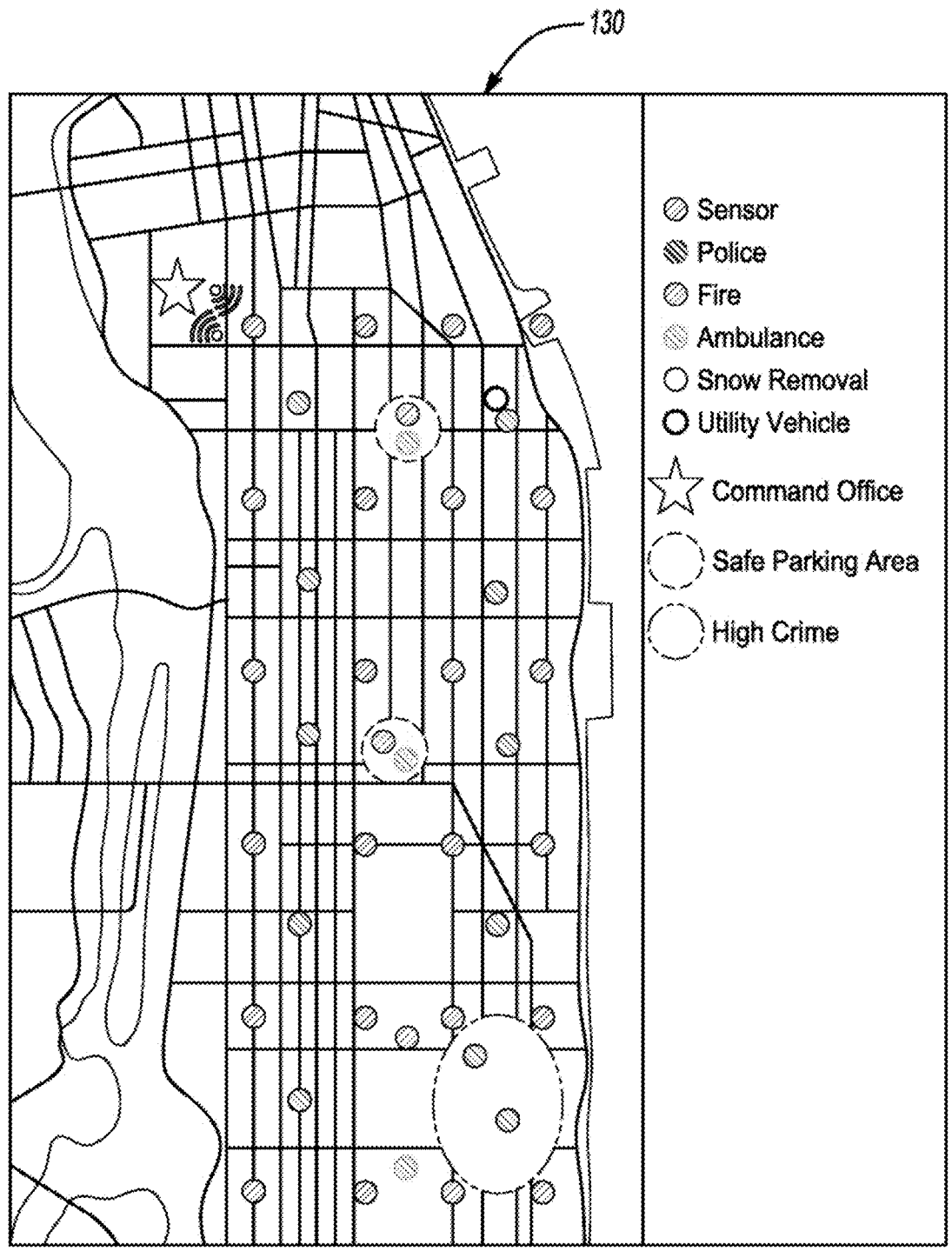
FIG. 11 illustrates an example of a map being displayed with locations of various roadside communication nodes communicating with various service vehicles (e.g., police, fire, ambulance, snow removal, etc.) to determine their location throughout a city and update in real-time the capabilities of such service vehicles.

FIG. 11 illustrates an embodiment of communication between the vehicles and communication nodes of roadside infrastructure for improving distribution of public (e.g., emergency) vehicles. FIG. 11 illustrates a map (e.g., Liberty City) 130 with locations of certain vehicles labeled on the map. These labels can be created based on information received from the roadside communication nodes. For example, the "sensors" labeled on the map may be locations of roadside communication nodes configured to detect the presence, location, etc. of vehicles equipped with a wireless communication system explained above, for example. These sensors can be located throughout a city, at several (or all) city road intersections. These sensors detect the position of various vehicles (e.g., police cars, fire trucks, ambulances, snow removal vehicles, utility vehicles, etc.) throughout the city. The sensors can be set up in a mesh-style network to provide durability and robustness against sensor failure, power failures, and sensor additions. A command center can wirelessly communicate with these sensors to receive this locational data, and create the map of the location of these vehicles shown in FIG. 11. The location of one vehicle can be detected by multiple sensors, thus allowing the sensors to triangulate the location of the vehicles for better accuracy.

A system can be utilized to improve the distribution of these vehicles. For example, the command center may be equipped with stored information regarding the crime rates of various locations of the city. This information may be updated real-time into the system so that the database can know the location and time of crimes in the city map. Based on that data, and looking at the real-time location of all emergency vehicles in the city, the system can command or suggest that an emergency vehicle (e.g., police) be relocated to a new location to be closer to a higher crime area. This is shown in FIG. 11, where a "high crime" area has been designated due to a large number of crimes occurring in that area relative to other areas in the city during a certain time period. The system may direct or request an additional police vehicle to be stationed in that area so that crimes can be handled in a timelier manner.

In one example, an algorithm can be implemented by the system for better distributing emergency vehicles, such as police. The system may receive data indicative of the location of all of the emergency or service vehicles, such as those shown in FIG. 11. The system may also be provided with a pre-populated or real-time-updated list of crimes and the location of those crimes. In response to the real-time location of an emergency or service vehicle relative to a designated high-crime area, the system can command an additional emergency or service vehicle to relocate to that high-crime area. In one example, if a police vehicle were to leave a designated high crime area, an additional police vehicle that is currently located outside of that high-crime area can be requested to be relocated to a location within the high-crime area. The data of these vehicles can be detected by the sensors of the roadside units, and relayed to the command center for processing and communication back to the roadside units and/or directly to the vehicles.

Figure 12A:
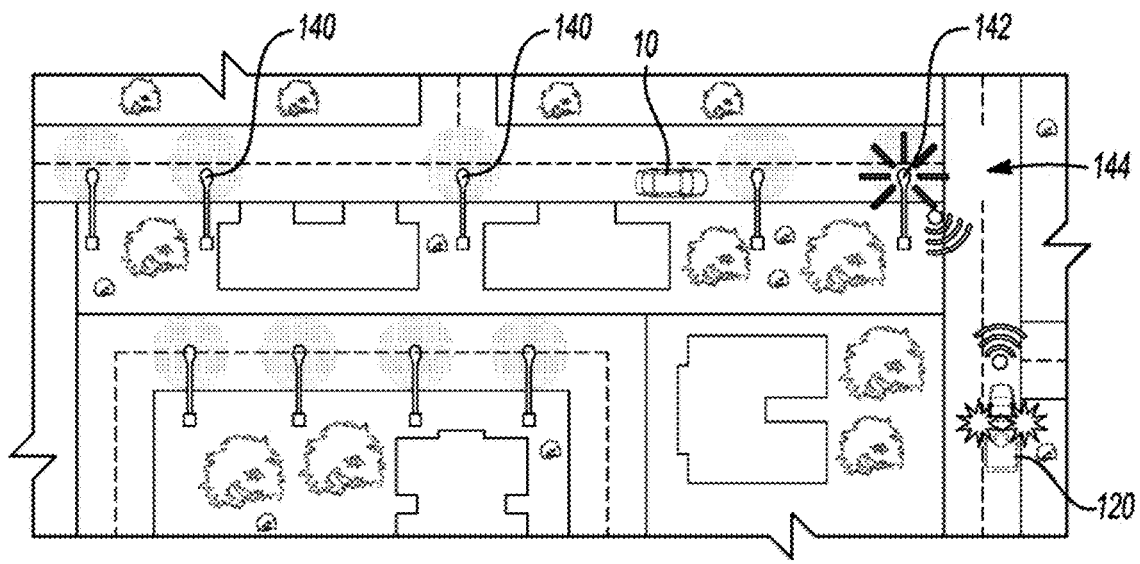
Figure 12B:
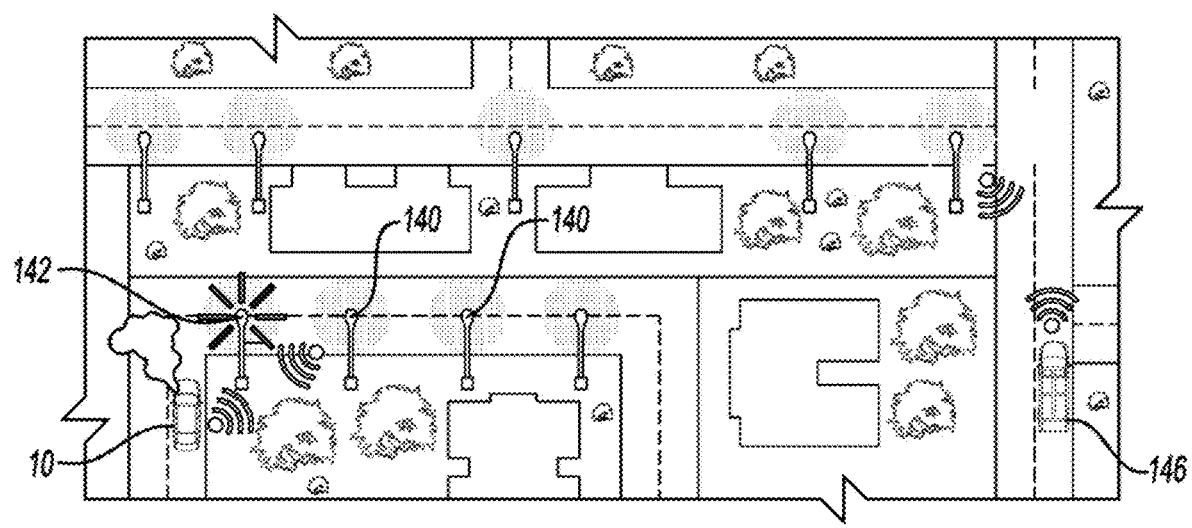
FIG. 12B is an overhead schematic of a smart-lighting communication system in which communication nodes allow the communication of a problem occurring in a vehicle, and lighting indicating the presence of the vehicle to better aid city services to locate the vehicle and provide services, according to an embodiment.

FIGS. 12A and 12B illustrate embodiments of communication between the vehicles and communication nodes of roadside infrastructure for providing a streetlight vehicle warning system. The infrastructure with communication nodes can be used to communicate with vehicles (e.g., emergency vehicles such as ambulances and police) via a smart streetlight lighting system. In one embodiment, if an emergency vehicle needs to drive past a traffic light or stop sign en route to an intended destination during an emergency, the lighting system can be used to warn other vehicles on the road of the incoming emergency vehicle.

FIG. 12A illustrates an overhead view of several roads with a plurality of roadside lights 140. The roadside lights 140 may be similar to the roadside lights 34 described above, equipped with communication nodes configured to receive and communicate data to and from vehicles on the road, and to other communication nodes along the road. An emergency vehicle 120 such as an ambulance is shown. The emergency vehicle 120 is equipped with a wireless communication system such as one described above, and is capable of communicating with the communication node of the roadside lights 140. The emergency vehicle 120 may be operated in an "emergency mode," in which sirens are sounding, lights are flashing, etc. Data indicating that the emergency vehicle 120 is operated in such an "emergency mode" can be transmitted to the roadside communication nodes of the roadside lights. In response to one of the communication nodes (e.g., the node at roadside light 142) receiving data indicating that an emergency vehicle 120 is within a threshold distance of that communication node, and the emergency vehicle 120 being driven in an "emergency mode," the roadside light 142 may operate in a corresponding "emergency-illumination mode." When the roadside light 142 operates in the emergency-illumination mode, the light source may flash, brighten, strobe, or the like to alert other vehicles (such as vehicle 10) and their drivers of the presence of an emergency vehicle 120.

The roadside light 142 may activate in a pattern or sequence to indicate where the emergency vehicle 120 is located. For example, in the embodiment shown in FIG. 12A, the emergency vehicle is approaching intersection 144 traveling North. In response to the emergency vehicle 120 being operated in the emergency mode and approaching the intersection 144 in the North direction, the system may command the roadside lights 140, 142 to flash sequentially in a pattern from South to North. For example, going in a direction from South to North, lights lining the street may sequentially illuminate in that direction, indicating that the emergency vehicle 120 is traveling on that road and in the North direction.

The communication nodes of the roadside light 142 may also receive route data from the emergency vehicle indicating a planned route of the emergency vehicle. The communication nodes that are in a direct communication with the emergency vehicle (e.g., via the wireless communication system) can then send corresponding alert signals to the remaining roadside lights along the planned route of the emergency vehicle so that those lights along the path can also operate in the emergency-illumination mode.

FIG. 12B illustrates an embodiment in which a vehicle 10 is broken down, having engine or transmission problems, for example. The wireless communication system of that vehicle 10 can communicate a signal to the nearby roadside communication nodes on the roadside lights 140 that the vehicle 10 has engine or transmission problems. This signal may be sent in response to a vehicle operating condition that outputs a "check engine" light within the vehicle cabin. In response to receiving such a signal from the vehicle 10, the roadside light 142 located closest to the vehicle 10 can operate in an emergency mode (e.g., flashing, strobing, etc.). This would help alert other vehicles, including emergency vehicle 120, of the location of the broken-down vehicle 10.

The communication nodes on the roadside lights 140 can also communicate to roadside units 32 or offsite command centers of the vehicle 10 being broken down. A corresponding signal or message can be sent to not only emergency vehicles of the location of the broken-down vehicle 10 utilizing wireless communication systems, but also to tow trucks 146. In response to a tow truck 146 equipped with a wireless communication system such as one described above being within range of a communication node of the system, the communication node can send a signal to the tow truck 146 indicating to the driver (via HMI, etc.) of the location of the broken-down vehicle 10. The tow truck 146 can then more easily discover the vehicle 10 by seeing the roadside light 142 flashing, strobing, etc.

As described herein, various infrastructure units can be commanded to deactivate or turn off to conserve power when, for example, there are no vehicles within a threshold distance from the infrastructure unit. It should be understood that this should mean that the infrastructure unit can be placed in a low-power mode, or its power output (e.g., emitted light) can be dimmed or completely turned off, unless otherwise stated. Various ways of reducing power output by the infrastructure unit should be understood to be within the scope of this disclosure, such as dimming lights, turning lights off, placing the unit in a power-save mode in which underlying hardware continues to run but the lights are turned off, etc.

In one embodiment, the communication nodes are configured to detect the amount of traffic and density of vehicles at a certain location (e.g., at an intersection.) In one example, one or more communication nodes are connected or associated with one or more traffic signals at an intersection. The communication node is configured to detect the presence or location of multiple vehicles, and/or establish a data communication with those vehicles as explained above. Based on the number of vehicles and their location, the communication node and/or its on-board processor can determine the amount of congestion or traffic in the area. In response, the traffic light can be commanded by the processor to turn green and allow traffic in a first direction while turning red and preventing traffic in a second direction transverse to the first direction. The traffic light can be commanded to remain in that state until traffic has cleared and the vehicle density has reduced below a threshold in the first direction. A maximum timer may be implemented such that the traffic light does not remain green in the first direction for an inappropriate amount of time (e.g., more than one minute). In response to either the end of the timer or the traffic density being below a threshold, the traffic signal can be commanded to change such that the light is red for the vehicles in the first direction and green for the vehicles in the second direction. The same teachings can be applied to cross-walks, such that communication nodes at the cross-walks can be configured to run similar systems with the traffic and congestion of mobile devices of pedestrians crossing the street.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A roadside infrastructure communication system for communicating vehicle data between various roadside infrastructure units, the system comprising:
   a plurality of roadside infrastructure units having a corresponding plurality of communication nodes, each communication node having a sensor configured to detect a presence of a vehicle, each communication node further having a wireless transceiver configured to communicate wirelessly with the vehicle via a wireless communication system, and each communication node configured to wirelessly communicate directly with one or more of the communication nodes;
   wherein the plurality of communication nodes includes a first communication node having one or more processors configured to:
      establish a communication link between the transceiver and the vehicle via the wireless communication system in response to one of the sensors detecting the presence of the vehicle,
      receive vehicle-specific data regarding the vehicle via the wireless communication system, and
      command the wireless transceiver to transmit at least a portion of the vehicle-specific data directly to a second of the communication nodes; and wherein the second of the communication nodes is configured to transmit a signal to a mobile device of a pedestrian informing the pedestrian of the presence of the vehicle.

2. The roadside infrastructure communication system of claim 1, wherein the second of the communication nodes is configured to transmit at least a portion of the vehicle-specific data to a third of the communication nodes.

3. The roadside infrastructure communication system of claim 1, wherein the second of the communication nodes is configured to transmit at least a portion of the vehicle-specific data to an offsite facility for processing and storage of the vehicle-specific data.

4. The roadside infrastructure communication system of claim 1, wherein the second of the communication nodes is configured to transmit at least a portion of the vehicle-specific data to the mobile device.

5. The roadside infrastructure communication system of claim 1, wherein the vehicle-specific data includes at least one of a location of the vehicle determined via a GPS system on-board the vehicle, a speed of the vehicle, a route of the vehicle, or a direction of the vehicle.

6. The roadside infrastructure communication system of claim 1, wherein one of the roadside infrastructure units includes the second of the communication nodes, and the second communication node includes one or more processors configured to activate the one of the roadside infrastructure units in response to at least a portion of the vehicle-specific data.

7. The roadside infrastructure communication system of claim 6, wherein the one of the roadside infrastructure units is a traffic signal or roadside light, and the one or more processors of the second communication node is configured to activate the traffic signal or roadside light in response to vehicle-specific data indicating the vehicle approaching the second communication node.

8. The roadside infrastructure communication system of claim 7, wherein the one or more processors of the second communication node is configured to activate the traffic signal or roadside light in response to the vehicle being within a threshold distance of the traffic signal or roadside light.

9. The roadside infrastructure communication system of claim 8, wherein the one or more processors of the second communication node is configured to deactivate or transition the traffic signal or roadside light into a power-save mode in response to the vehicle being outside a second threshold distance of the traffic signal or roadside light.

10. The roadside infrastructure communication system of claim 5, wherein the vehicle-specific data is determined on-board the vehicle, and is transferred to the communication node subsequent to determination on-board the vehicle.

11. The roadside infrastructure communication system of claim 1, wherein the vehicle-specific data is a location of the vehicle determined via a GPS system on-board the vehicle.

12. The roadside infrastructure communication system of claim 1, wherein the vehicle-specific data is a route of the vehicle.

13. The roadside infrastructure communication system of claim 1, wherein the vehicle-specific data is a direction of the vehicle.

14. A roadside infrastructure communication system for communicating vehicle data between various roadside infrastructure units, the system comprising:

a plurality of roadside infrastructure units having a corresponding plurality of communication nodes, each communication node further having a wireless transceiver configured to communicate wirelessly with the vehicle via a wireless communication system, and each communication node configured to wirelessly communicate directly with one or more of the communication nodes;

wherein the plurality of communication nodes includes a first communication node having one or more processors configured to:

establish a communication link between the transceiver and the vehicle via the wireless communication system, receive vehicle-specific data processed on-board the vehicle from the vehicle via the wireless communication system, and command the wireless transceiver to transmit at least a portion of the vehicle-specific data directly to a second of the communication nodes; and wherein each communication node includes a sensor configured to detect a presence of the vehicle, and the communication link between the transceiver and the vehicle is established in response to one of the sensors detecting the presence of the vehicle.

15. The roadside infrastructure communication system of claim 14, wherein the second of the communication nodes is configured to transmit a signal to a mobile device of a pedestrian informing the pedestrian of the presence of the vehicle.

16. The roadside infrastructure communication system of claim 15, wherein the second of the communication nodes is configured to transmit at least a portion of the vehicle-specific data to the mobile device.

17. The roadside infrastructure communication system of claim 14, wherein the vehicle-specific data includes at least one of a location of the vehicle determined via a GPS system on-board the vehicle, a speed of the vehicle, a route of the vehicle, or a direction of the vehicle.

18. The roadside infrastructure communication system of claim 14, wherein the wireless communication system is a dedicated short-range communication (DSRC) system, and the wireless transceivers are DSRC transceivers.

* * * * *